United States Patent [19]
Stanton et al.

[11] Patent Number: 5,430,870
[45] Date of Patent: Jul. 4, 1995

[54] SAVING AND RESTORING TRAVERSAL STATE ATTRIBUTES OF A DIRECTED ACYCLIC GRAPH STRUCTURE NETWORK FOR A PARENT STRUCTURE WHEN IT INVOKES A CHILD STRUCTURE FOR TRAVERSAL

[75] Inventors: W. Dean Stanton, Jackson, Mich.; Michael Deering, Los Altos, Calif.

[73] Assignee: Sun Microsystems, Inc., Mountain View, Calif.

[21] Appl. No.: 959,698

[22] Filed: Oct. 13, 1992

[51] Int. Cl.$^6$ .............................................. G06F 17/30
[52] U.S. Cl. ............................... 395/600; 395/160; 364/DIG. 1
[58] Field of Search ................ 395/600, 700, 160

[56] References Cited

U.S. PATENT DOCUMENTS

| | | | |
|---|---|---|---|
| 4,870,599 | 9/1989 | Hempel et al. | 364/518 |
| 5,093,917 | 3/1992 | Campbell et al. | 395/700 |
| 5,119,477 | 6/1992 | Ebbers | 395/160 |
| 5,182,797 | 1/1993 | Liang et al. | 395/160 |
| 5,261,097 | 11/1993 | Saxon | 395/650 |

OTHER PUBLICATIONS

Rost et al., "PEX: A Network-Transparent 3D Graphics System", IEEE Computer Graphics & Applications, Jul. 1989, pp. 14–26.

*Primary Examiner*—Paul V. Kulik
*Assistant Examiner*—Larry J. Ellcessor
*Attorney, Agent, or Firm*—Blakely Sokoloff Taylor & Zafman

[57] ABSTRACT

A set in structure (SIS) list is established for each DAG structure of a DAG structure network. Additionally, a used before set (UBS) list is established for each structure invoking element in the DAG data structure. At each invocation of a DAG structure, a list of traversal state list (TSL) attribute values that need to saved and subsequently restored (SAR) for the invoking DAG data structure is established. The SAR list of an invoked DAG data structure is established based on a list of attributes needed by the invoking DAG data structure (N) and the SIS of the invoked DAG data structure. The N list is established based on the UBS list of the invoking structure element of the invoking DAG structure, and a need from child (NFC) attribute list of the invoking DAG data structure. Only values of the TSL attributes included in the SAR list are saved before the invoked DAG data structure is traversed. The saved TSL attribute values are restored for the invoking DAG data structure, when the invoked DAG data structure is exited. As a result unnecessary savings and restorings of TSL attributes for the invoking DAG data structure are avoided.

16 Claims, 16 Drawing Sheets

EACH EXECUTE STRUCTURE PROVIDES $UBS'_i$

| | 1ST EXEC | 2ND EXEC | 3RD EXEC |
|---|---|---|---|
| 94 | $UBS'_1$ = ALL, NFC' = PLW | $UBS'_2$ = PLW, NFC' = PLW | $UBS'_3$ = <EMPTY>, NFC' = PLW |
| 96 | N = NFC' ∪ $UBS'_1$<br>= PLW ∪ ALL<br>= ALL | N = NFC' ∪ $UBS'_2$<br>= PLW ∪ PLW<br>= PLW | N = NFC' ∪ $UBS'_3$<br>= PLW ∪ <EMPTY><br>= PLW |
| 98 | SAR = N ∩ SIS<br>= ALL ∩ PLC<br>= PLC | SAR = N ∩ SIS<br>= PLW ∩ PLC<br>= <EMPTY> | SAR = N ∩ SIS<br>= PLW ∩ PLC<br>= <EMPTY> |
| 100 | NFC = N - SIS<br>= ALL - PLC<br>= ALL ∩ PLW<br>= PLW | NFC = N - SIS<br>= PLW - PLC<br>= PLW ∩ PLW<br>= PLW | NFC = N - SIS<br>= PLW - PLC<br>= PLW ∩ PLW<br>= PLW |
| 102 | SAVE TSL (PLC) | SAVE TSL ( ) | SAVE TSL ( ) |

AT STRUCTURE EXIT:

| 104 | RESTORE TSL (PLC) | RESTORE TSL ( ) | RESTORE TSL ( ) |

82 { EXECUTE POSTED STRUCTURE WITH UBS' = ALL & NFC' = ANYTHING

84 { N = NFC' UNION UBS'<br>= (ANYTHING) UNION ALL<br>= ALL

86 { SAR = N INTERSECT SIS<br>= ALL INTERSECT PLC<br>= PLC

88 { NFC = N - SIS<br>= ALL - PLC<br>= PLW

90 { SAVE TSL(PLC)

AT STRUCTURE EXIT:

92 { RESTORE TSL(PLC)

*Figure 8*

NON-BUNDABLE-ABLE ATTRIBUTES IN WORD Ø

| BIT FIELD NAME | BIT PATTERN | ATTRIBUTE |
|---|---|---|
| HKST0_OTHER | 0X80000000 | <NON-STATE-ATTRIBUTES> |
| HKST0_LINE_GEOM_FORMAT | 0X40000000 | HK_LINE_GEOM_FORMAT |
| HKST0_LINE_OFF_COLOR | 0X20000000 | HK_LINE_OFF_COLOR |
| HKST0_TRI_GEOM_FORMAT | 0X10000000 | HK_TRI_GEOM_FORMAT |
| HKST0_USE_BACK_PROPS | 0X08000000 | HK_USE_BACK_PROPS |
| HKST0_SILHOUETTE_EDGE | 0X04000000 | HK_SILHOUETTE_EDGE |
| HKST0_FACE_CULLING_MODE | 0X02000000 | HK_FACE_CULLING_MODE |
| HKST0_EDGE_OFF_COLOR | 0X01000000 | HK_EDGE_OFF_COLOR |
| HKST0_EDGE_Z_OFFSET | 0X00800000 | HK_EDGE_Z_OFFSET |
| HKST0_RTEXT_UP_VEC | 0X00400000 | HK_RTEXT_UP_VEC |
| HKST0_RTEXT_PATH | 0X00200000 | HK_RTEXT_PATH |
| HKST0_RTEXT_HEIGHT | 0X00100000 | HK_RTEXT_HEIGHT |
| HKST0_RTEXT_ALIGNMENT | 0X00080000 | HK_RTEXT_ALIGNMENT |
| HKST0_RTEXT_SLANT | 0X00040000 | HK_RTEXT_SLANT |
| HKST0_ATEXT_UP_VEC | 0X00020000 | HK_ATEXT_UP_VEC |
| HKST0_ATEXT_PATH | 0X00010000 | HK_ATEXT_PATH |
| HKST0_ATEXT_HEIGHT | 0X00008000 | HK_ATEXT_HEIGHT |
| HKST0_ATEXT_ALIGNMENT | 0X00004000 | HK_ATEXT_ALIGNMENT |
| HKST0_ATEXT_STYLE | 0X00002000 | HK_ATEXT_STYLE |
| HKST0_ATEXT_SLANT | 0X00001000 | HK_ATEXT_SLANT |
| HKST0_MARKER_GEOM_FORMAT | 0X00000800 | HK_MARKER_GEOM_FORMAT |
| HKST0_Z_BUFFER_COMPARE | 0X00000400 | HK_Z_BUFFER_COMPARE |
| HKST0_Z_BUFFER_UPDATE | 0X00000200 | HK_Z_BUFFER_UPDATE |
| HKST0_DEPTH_CUE_ENABLE | 0X00000100 | HK_DEPTH_CUE_ENABLE |
| HKST0_DEPTH_CUE_PARAMETERS | 0X00000080 | HK_DEPTH_CUE_PARAMETERS |
| HKST0_DEPTH_CUE_COLOR | 0X00000040 | HK_DEPTH_CUE_COLOR |
| HKST0_VIEW | 0X00000020 | HK_VIEW |
| HKST0_Z_RANGE | 0X00000010 | HK_Z_RANGE |
| HKST0_GUARD_BAND | 0X00000008 | HK_GUARD_BAND |
| HKST0_LMT | 0X00000004 | HK_LOAD_LMT,HK_PRG_CONCAT_LMT,HK_POST_CONCAT_LMT |
| HKST0_GMT | 0X00000002 | HK_LOAD_GMT |
| HKST0_CMT | 0X00000001 | HK_LOAD_LMT,HK_PRG_CONCAT_LMT,HK_POST_CONCAT_LMT, HK_LOAD_GMT, HK_GMT_TO_CMT |

| BIT FIELD NAME | BIT PATTERN | ATTRIBUTE |
| --- | --- | --- |
| HKST1_NAME_SET | 0X80000000 | HK_NAME_SET |
| HKST1_MCP_MASK | 0X40000000 | HK_MCP_MASK |
| HKST1_NUM_MCP | 0X20000000 | HK_NUM_MCP |
| HKST1_MCP | 0X10000000 | HK_ADD_MCP |
| HKST1_CSVN | 0X08000000 | HK_CSVN |
| HKST1_UPICK_ID | 0X04000000 | HK_UPICK_ID |
| HKST1_LIGHT_MASK | 0X02000000 | HK_LIGHT_MASK |
| HKST1_INVISIBILITY | 0X01000000 | HK_INVISIBILITY |
| HKST1_RASTER_OP | 0X00800000 | HK_RASTER_OP |
| HKST1_PLANE_MASK | 0X00400000 | HK_PLANE_MASK |
| HKST1_CURRENT_WID | 0X00200000 | HK_CURRENT_WID |
| HKST1_WID_CLIP_MASK | 0X00100000 | HK_WID_CLIP_MASK |
| HKST1_WID_WRITE_MASK | 0X00080000 | HK_WID_WRITE_MASK |
| HKST1_HIGHLIGHT_COLOR | 0X00040000 | HK_HIGHLIGHT_COLOR |

BUNDLE - ABLE ATTRIBUTES IN WORD 2, 4, AND 6

| BIT FIELD NAME | BIT PATTERN | ATTRIBUTE | |
|---|---|---|---|
| HKSTBO_LINE_COLOR | 0X80000000 | HK_LINE_COLOR | |
| HKSTBO_LINE_ANTIALIASING | 0X40000000 | HK_LINE_ANTIALIASING | |
| HKSTBO_LINE_SHADING_METHOD | 0X20000000 | HK_LINE_SHADING_METHOD | |
| HKSTBO_LINE_STYLE | 0X10000000 | HK_LINE_STYLE | |
| HKSTBO_LINE_PATTERN | 0X08000000 | HK_LINE_PATTERN | |
| HKSTBO_LINE_WIDTH | 0X04000000 | HK_LINE_WIDTH | |
| HKSTBO_LINE_CAP | 0X02000000 | HK_LINE_CAP | |
| HKSTBO_LINE_JOIN | 0X01000000 | HK_LINE_JOIN | 122a |
| HKSTBO_LINE_MITER_LIMIT | 0X00800000 | HK_LINE_MITER_LIMIT | |
| HKSTBO_CURVE_APPROX | 0X00400000 | HK_CURVE_APPROX | 124a, or |
| HKSTBO_TEXT_COLOR | 0X00200000 | HK_TEXT_COLOR | |
| HKSTBO_TEXT_ANTIALIASING | 0X00100000 | HK_TEXT_ANTIALIASING | 126a |
| HKSTBO_TEXT_EXPANSION_FACTOR | 0X00080000 | HK_TEXT_EXPANSION_FACTOR | |
| HKSTBO_TEXT_SPACING | 0X00040000 | HK_TEXT_SPACING | |
| HKSTBO_TEXT_LINE_WIDTH | 0X00020000 | HK_TEXT_LINE_WIDTH | |
| HKSTBO_TEXT_CAP | 0X00010000 | HK_TEXT_CAP | |
| HKSTBO_TEXT_JOIN | 0X00008000 | HK_TEXT_JOIN | |
| HKSTBO_TEXT_MITER_LIMIT | 0X00004000 | HK_TEXT_MITER_LIMIT | |
| HKSTBO_TEXT_CHARACTER_SET | 0X00002000 | HK_TEXT_CHARACTER_SET | |
| HKSTBO_TEXT_FONT | 0X00001000 | HK_TEXT_FONT | |
| HKSTBO_MARKER_COLOR | 0X00000800 | HK_MARKER_COLOR | |
| HKSTBO_MARKER_ANTIALIASING | 0X00000400 | HK_MARKER_ANTIALIASING | |
| HKSTBO_MARKER_SIZE | 0X00000200 | HK_MARKER_SIZE | |
| HKSTBO_MARKER_TYPE | 0X00000100 | HK_MARKER_TYPE | |

*Figure 11c*

BUNDLE - ABLE ATTRIBUTES IN WORD 3, 5, AND 7

| BIT FIELD NAME | BIT PATTERN | ATTRIBUTE |
|---|---|---|
| HKSTB1_FRONT_INTERIOR_STYLE | 0X800000000 | HK_FRONT_INTERIOR_STYLE |
| HKSTB1_BACK_INTERIOR_STYLE | 0X400000000 | HK_BACK_INTERIOR_STYLE |
| HKSTB1_FRONT_GENERAL_STYLE | 0X200000000 | HK_FRONT_GENERAL_STYLE |
| HKSTB1_BACK_GENERAL_STYLE | 0X100000000 | HK_BACK_GENERAL_STYLE |
| HKSTB1_FRONT_SURFACE_COLOR | 0X080000000 | HK_FRONT_SURFACE_COLOR |
| HKSTB1_BACK_SURFACE_COLOR | 0X040000000 | HK_BACK_SURFACE_COLOR |
| HKSTB1_FRONT_SHADING_METHOD | 0X020000000 | HK_FRONT_SHADING_METHOD |
| HKSTB1_BACK_SHADING_METHOD | 0X010000000 | HK_BACK_SHADING_METHOD |
| HKSTB1_FRONT_LIGHTING_DEGREE | 0X008000000 | HK_FRONT_LIGHTING_DEGREE |
| HKSTB1_BACK_LIGHTING_DEGREE | 0X004000000 | HK_BACK_LIGHTING_DEGREE |
| HKSTB1_FRONT_MATERIAL_PROPERTIES | 0X002000000 | HK_FRONT_MATERIAL_PROPERTIES |
| HKSTB1_BACK_MATERIAL_PROPERTIES | 0X001000000 | HK_BACK_MATERIAL_PROPERTIES |
| HKSTB1_FRONT_SPECULAR_COLOR | 0X000800000 | HK_FRONT_SPECULAR_COLOR |
| HKSTB1_BACK_SPECULAR_COLOR | 0X000400000 | HK_BACK_SPECULAR_COLOR |
| HKSTB1_FRONT_TRANSPARENCY_DEGREE | 0X000200000 | HK_FRONT_TRANSPARENCY_DEGREE |
| HKSTB1_BACK_TRANSPARENCY_DEGREE | 0X000100000 | HK_BACK_TRANSPARENCY_DEGREE |
| HKSTB1_FRONT_HATCH_SYTLE | 0X000080000 | HK_FRONT_HATCH_SYTLE |
| HKSTB1_BACK_HATCH_SYTLE | 0X000040000 | HK_BACK_HATCH_SYTLE |
| HKSTB1_HOLLOW_ANTIALIASING | 0X000020000 | HK_HOLLOW_ANTIALIASING |
| HKSTB1_EDGE | 0X000010000 | HK_EDGE |
| HKSTB1_EDGE_ANTIALIASING | 0X000000900 | HK_EDGE_ANTIALIASING |
| HKSTB1_EDGE_COLOR | 0X000000400 | HK_EDGE_COLOR |
| HKSTB1_EDGE_STYLE | 0X000000200 | HK_EDGE_STYLE |
| HKSTB1_EDGE_PATTERN | 0X000000100 | HK_EDGE_PATTERN |
| HKSTB1_EDGE_WIDTH | 0X000000080 | HK_EDGE_WIDTH |
| HKSTB1_EDGE_CAP | 0X000000040 | HK_EDGE_CAP |
| HKSTB1_EDGE_JOIN | 0X000000020 | HK_EDGE_JOIN |
| HKSTB1_EDGE_MITER_LIMIT | 0X000000010 | HK_EDGE_MITER_LIMIT |
| HKSTB1_SURF_APPROX | 0X000000008 | HK_SURF_APPROX |
| HKSTB1_TRIM_APPROX | 0X000000004 | HK_TRIM_APPROX |

*Figure 11d*

SAVING AND RESTORING TRAVERSAL STATE ATTRIBUTES OF A DIRECTED ACYCLIC GRAPH STRUCTURE NETWORK FOR A PARENT STRUCTURE WHEN IT INVOKES A CHILD STRUCTURE FOR TRAVERSAL

BACKGROUND OF THE INVENTION

1. Field of the Invention

The present invention relates to the field of computer systems. More specifically, the present invention relates to manipulation of structures organized as directed acyclic graph structure networks on these computer systems.

2. Background

In many computer applications, the fundamental data elements are first organized into structures comprising non-structure-invoking and structure-invoking elements. The non-structure-invoking elements include various primitives having attributes, and functions for altering the values of the attributes. The structures are further organized into directed acyclic graph (DAG) structure networks in accordance to the way they invoke each other. Traversal is the process by which the structure elements of an instance of a DAG structure is processed. Associated with each traversal process is a traversal state list comprising the current traversal state attribute values. Since the traversal of an invoked structure may affect the traversal state attribute values, the traversal state attribute values are typically saved when invoking another structure, and restored upon returning from the invoked structure. For simplicity, the savings and restorings are often performed without regard to the fact whether the traversal state attributes are going to be affected by the traversal of the invoked structure.

A particular example of such data organization and manipulation is the Programmer's Hierarchical Interactive Graphics System (PHIGS). PHIGS is a functional interface between an application program and a configuration of graphical input and output devices in a computer system. The PHIGS interface provides a high level abstraction of the graphical functions, such that hardware peculiarities are shielded from the application program. Under PHIGS, application specific and graphical data are stored in a centralized hierarchical structure, known as the centralized structure store (CSS). The fundamental entity of data is a structure element and these are grouped together into units called structures. A structure comprises non-structure-invoking elements, i.e. output primitive structure elements such as polyline and polymarks, attribute specification structure elements such as set polyline width (PLW) and polyline color (PLC), and transformation and clipping structure elements such as set local transformation and set modeling clipping volume, and structure-invoking elements, i.e. the control structure element, execute structure. The structures are further organized as DAG structure networks.

To display an instance of a structure network, it is first posted identifying the structure network for display. The structure network is then traversed: staring from the top of the network, the structure elements are interpreted, one structure element at a time. At the start of traversal, the traversal state list for storing the current state values is created. The effect of interpreting a structure element depends on nature of the structure element. When an execute structure element is interpreted, the following actions occur:

a) traversal of the current structure is suspended;
b) the current state values of the traversal state list is saved;
c) global and local modeling transformation are set;
d) the executed structure network is completely traversed;
e) the saved PHIGS traversal state list values are restored;
f) traversal of the current structure is resumed.

The traversal state list comprises over 50 current state attribute values. Each time an execute structure element is interpreted during a traversal, the 50 plus current state attribute values have to be saved and subsequently restored. Additionally, each instance of a posted structure network is completely retraversed, each time the posted structure network is changed. As a result, there are a lot of state attribute value savings and restorings. Since, in many cases, the state attribute values are unaffected by the invoked structure, their savings and restorings are unnecessary.

For further description of PHIGS, see American National Standard X3.144—1988, Computer Graphics—Programmer's Hierarchical Interactive Graphics System (PHIGS) Functional Description, published by the American National Standards Institute, Inc.

Thus, it is desirable if the unaffected state attributes of a DAG structure network can be identified, and the savings and restorings of their current values can be avoided, when one structure invokes another for traversal. As will be disclosed, the present invention provides a method and apparatus for saving and restoring traversal state attribute values of a DAG structure network for a parent structure when it invokes a child structure for traversal that achieves the desired results.

SUMMARY OF THE INVENTION

A method and apparatus for saving and restoring traversal state attribute values of a directed acyclic graph (DAG) structure network in a computer system for a parent structure when it invokes a child structure for traversal is disclosed. The method and apparatus eliminates unnecessary savings and restorings of traversal state attribute values. The method and apparatus has particular application to graphical computer systems that support PHIGS as specified by the ANS X3.144—1988 or X3D-PEX as defined by the MIT X Consortium, whose fundamental data elements are organized as structures which in turn are organized as DAG structure networks.

Under the present invention, a set in structure (SIS) list is established for each DAG structure, and a used before set (UBS) list is established for each structure-invoking element in a DAG structure. At each invocation of a DAG structure, a list of traversal state list (TSL) attribute values that need to be saved and subsequently restored (SAR) for the invoking DAG structure is established. Only values of the TSL attributes included in the SAR list are saved before the invoked DAG structure is traversed. The saved TSL attribute values are restored for the invoking DAG structure, when the invoked DAG structure is exited.

The SAR list of an invoked DAG structure is established based on a list of attributes needed by the invoking DAG structure (N) and the SIS of the invoked DAG structure. The N list is established based on the UBS list of the invoking structure element of the invoking DAG structure, and a need from child (NFC) attribute list of the invoking DAG structure. Additionally, a NFC attribute list of the invoked DAG structure is also established, in the event the invoked DAG structure in turn invokes another DAG structure. The NFC attribute list of the invoking DAG structure is established when the invoking DAG structure itself was invoked.

In one group of embodiments, the establishment of the SIS and UBS lists are implemented as part of the function for saving DAG structures. In an alternate group of embodiments, the establishment of the SIS and UBS lists are implemented as part of the preparation for traversing the invoked DAG structure. For some embodiments in either group, the establishment of the N and SAR lists for the invoking DAG structure, the saving of the TSL attribute values for the invoking DAG structure based on the SAR list, and the establishment of the NFC attribute list for the invoked DAG structure are implemented as part of the instruction for entering a DAG structure for traversal. The restoring of the saved TSL attributes for the invoking DAG structure is implemented as part of the instruction for returning from an invoked DAG structure after traversal.

BRIEF DESCRIPTION OF THE DRAWINGS

The objects, features, and advantages of the present invention will be apparent from the following detailed description of the preferred and alternate embodiments of the present invention with references to the drawings in which:

FIG. 8 illustrates the savings and restorings of the traversal state attributes for the exemplary structures of FIG. 5 under the present invention.

FIGS. 11a–11d illustrate exemplary attribute content in the SIS and UBS masks of the embodiment of FIG. 9.

DETAILED DESCRIPTION PRESENTLY PREFERRED AND ALTERNATE EMBODIMENTS

A method and apparatus for saving and restoring traversal state attribute values of a directed acyclic graph (DAG) structure network in a computer system for a parent structure when it invokes a child structure for traversal is disclosed. The method and apparatus eliminates unnecessary savings and restorings of traversal state attribute values. The method and apparatus has particular application to graphical computer systems that support PHIGS as specified by the ANS X3.144—1988, or X3D-PEX as defined by the MIT X Consortium, whose fundamental data elements are organized as structures which in turn are organized as DAG structure networks. In the description to follow, for ease of understanding, the present invention will be described using PHIGS. However, it will be appreciated that the present invention is not limited to graphical computer systems with PHIGS. Additionally, for purposes of explanation, specific numbers, materials and configurations are set forth in order to provide a thorough understanding of the present invention. It will be apparent to one skilled in the art that the present invention may be practiced without the specific details. In other instances, well known systems are shown in diagrammatical or block diagram form in order not to obscure the present invention unnecessarily.

Figure 1:
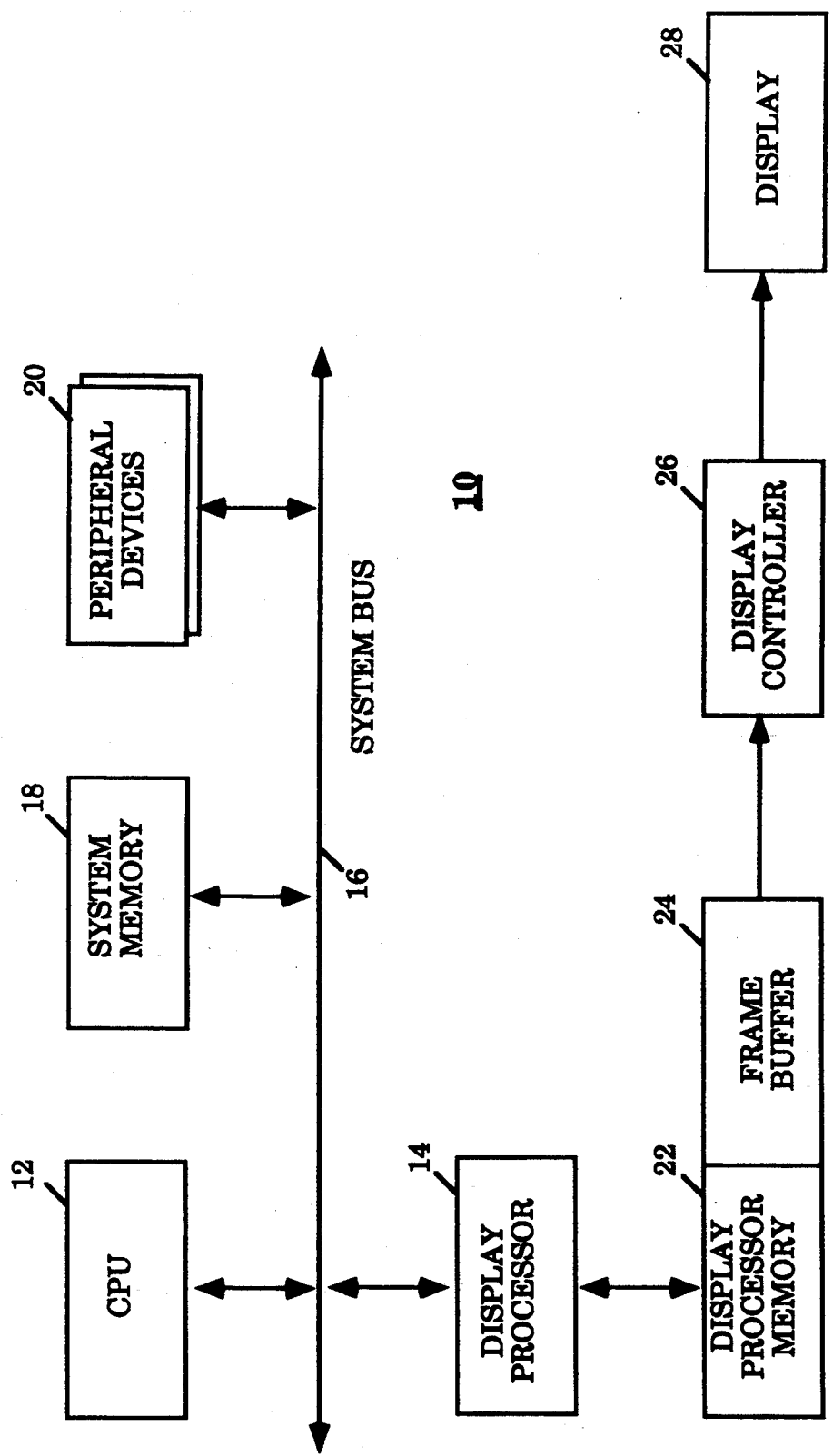
FIG. 1 illustrates an exemplary computer system incorporated with the teachings of the present invention.
Figure 2:
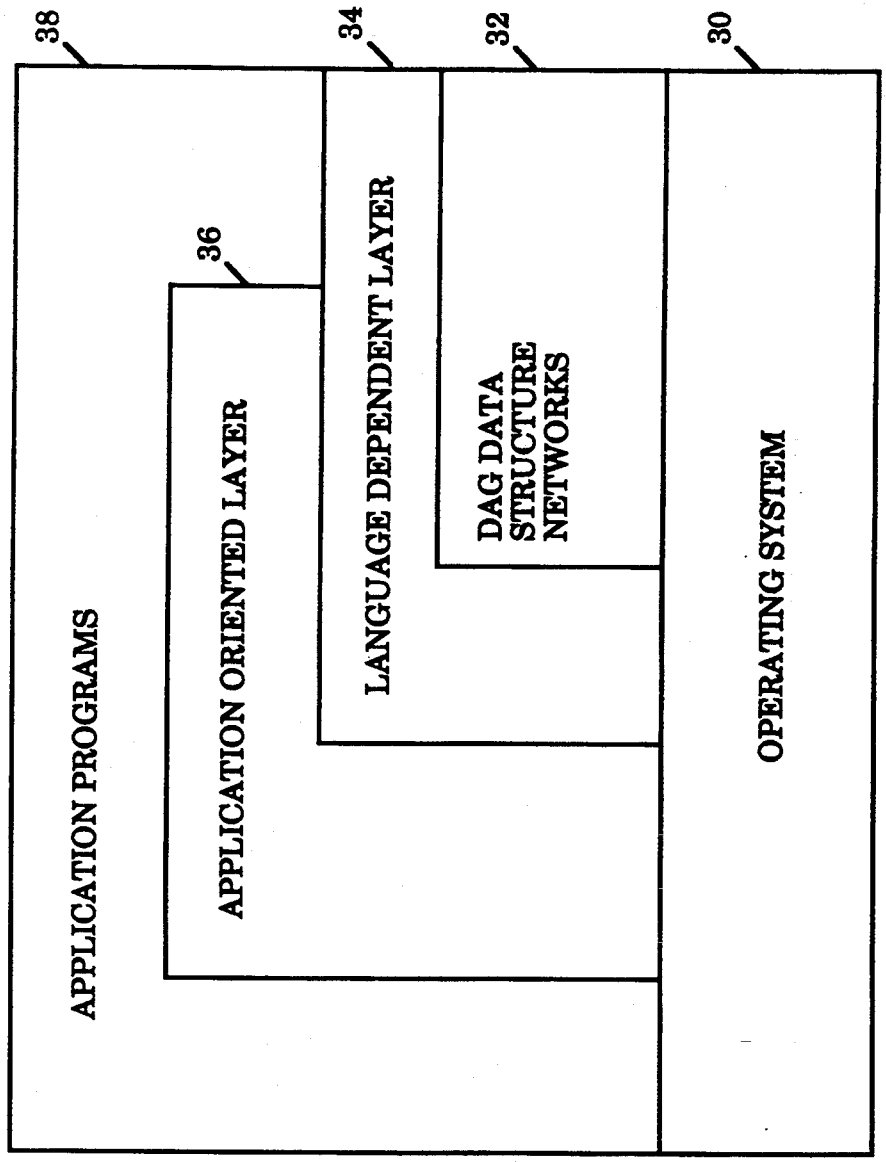
FIG. 2 illustrates the software elements of the exemplary computer system of FIG. 1.

Referring now to FIGS. 1–2, two block diagrams illustrating an exemplary computer system incorporated with the teachings of the present invention are shown. As shown in FIG. 1, the exemplary computer system 10 comprises a central processor (CPU) 12, a display processor 14 and a system bus 16, coupled to each other. Additionally, the computer system 10 comprises a system memory 18 and a plurality of peripheral devices 20, also coupled to the system bus 16. Furthermore, the computer system 10 comprises a display processor memory 22, a frame buffer 24, a display controller 26, and a display 28, coupled serially. The display processor memory 22 is also coupled to the display processor 14. The exemplary computer system 10 is intended to represent a broad category of general purpose or specialized computer systems, with or without an integrated display processor. Except for the teachings of the present invention incorporated, the constitution and basic functions of these elements 12–28 are well known, and will not be otherwise described.

FIG. 2 illustrates the various software elements of the exemplary computer system of FIG. 1. Shown are DAG structure networks 32 completely encapsulated by a language dependent layer 34, which in turn is partially encapsulated by an application oriented layer. The application programs 38 access the DAG structure networks 32 through either the application oriented layer 36 or the language dependent layer 34. The application programs 38, the application oriented layer 36, the language dependent layer 34, and the DAG structure networks 32, all have accesses to operating system services 30.

Similar to the hardware elements of the exemplary computer system of FIG. 1, the DAG structure networks and the various software elements 30–38 are intended to represent a broad category of DAG structure networks, such as PHIGS or X3D-PEX, and software elements found in many computer systems. Except for the teachings of the present invention incorporated for DAG structures, and the processings performed for DAG structure invocations and returns, the constitution, basic functions, and external manifestations of these elements 30–38 are well known, and will not be otherwise described.

Figure 3:
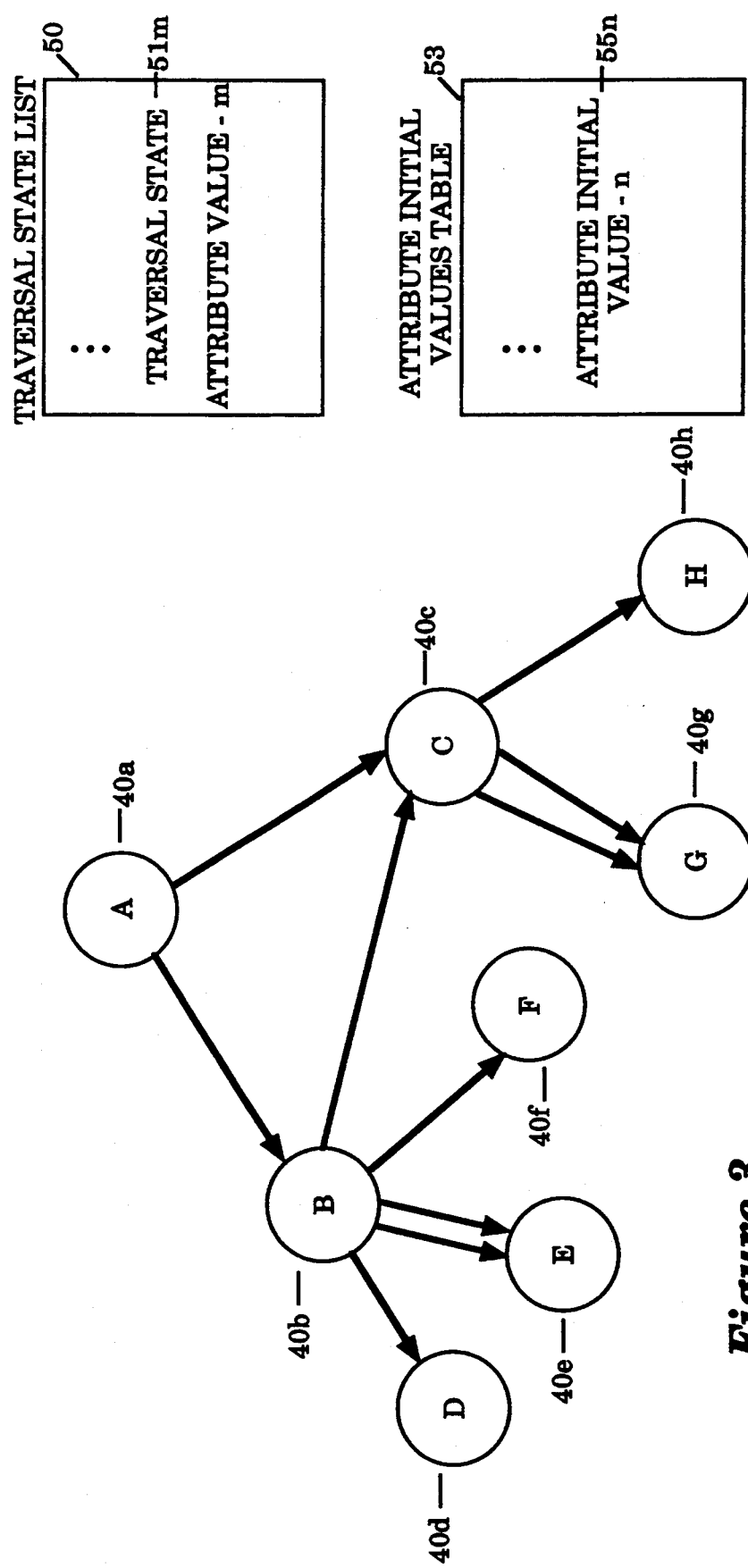
FIG. 3 illustrates a DAG structure network, a traversal state list, and an attribute initial value table.
Figure 4:
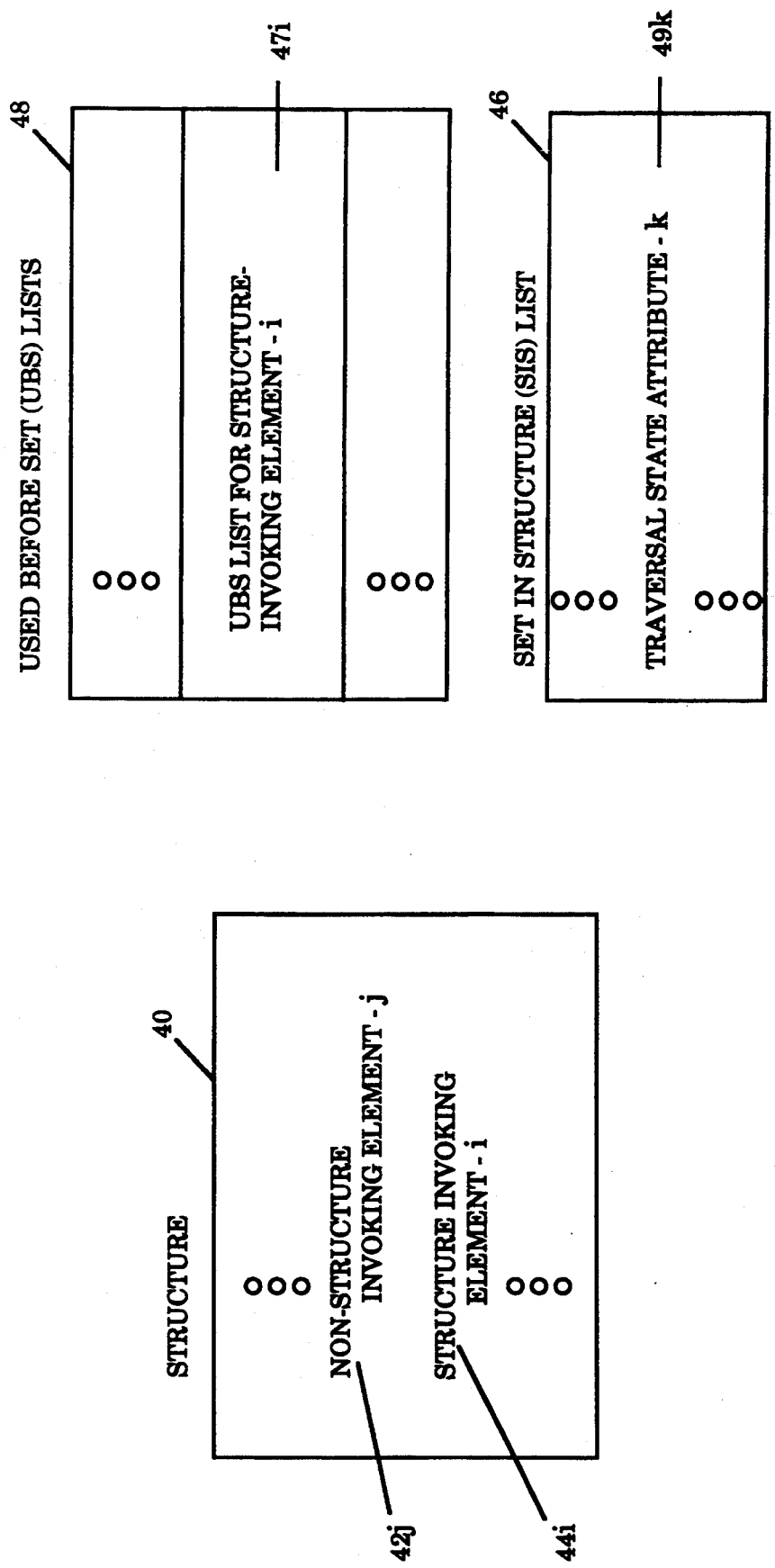
FIG. 4 illustrates a DAG structure, the associated set in structure (SIS) list, and the associated collection of used before set (UBS) lists of the present invention.

Referring now to FIGS. 3–4, two block diagrams illustrating a DAG structure network incorporated with the teachings of the present invention are shown.

Shown in FIG. 3 is a DAG structure network 41 comprising a number of DAG structures, 40a–40h. As illustrated in FIG. 4, each DAG structure 40 comprises a number non-structure-invoking elements, e.g. 42j, and a number of structure-invoking elements, e.g. 44i. Particular examples of non-structure-invoking elements include the PHIGS' output primitive structure elements, attribute specification structure elements, and transformation, and clipping structure elements described in the background section. A particular example of structure-invoking element is the PHIGS' control structure element described in the background section.

While for ease of understanding, the present invention is being described with structure-invoking and non-structure invoking elements, wherein some of the non-structure invoking elements are attribute-setting elements, it will be appreciated that the present invention may be practiced with structure-invoking elements which also set the values of attributes.

Referring back to FIG. 3, the structures, 40a–40h, invoke each other as illustrated by the arrows in the diagram. A structure may invoke one or more structure in the network, as illustrated by structures A, B, and C, 40a–40c. Conversely, a structure may be invoked by one or more structure in the network, as illustrated by structure C 40c. Additionally, an invoking structure may have more than one structure-invoking elements for invoking another structure, as illustrated by the double arrows originating from structures B and C, 40b–40c. An invoking structure is a parent structure, and an invoked structure is a child structure.

Still referring to FIG. 3, traversal is the process by which the structures and their structure elements of an instance of a DAG structure network are processed. The traversal process interprets each structure element in an instance of a DAG structure network sequentially, starting at the first structure element of the top of the network. A traversal state list 50 is associated with each traversal process. Each traversal state list 50 comprises a number of traversal state attribute values, e.g. 51m. The traversal state attribute values, e.g. 51m, are initialized at the beginning of the traversal process. The initial values, e.g. 55n, are stored in an attribute initial value table 53 associated with a collection of DAG structure networks comprising the DAG structure network whose instance is being traversed.

The effect of interpreting a structure element depends on the nature of the structure element. Output primitive elements result in the creation of output primitives, using attribute values; attribute-setting elements modify values in the traversal state list. When an structure-invoking element is interpreted, the following actions occur:

a) traversal of the current structure is suspended;
b) the current state values of the traversal state list is saved;
c) application specific structure-invoking actions are taken;
d) the executed structure is completely traversed;
e) the saved traversal state list values are restored;
f) traversal of the current structure is resumed.

Referring now to FIG. 4 again, under the present invention, associated with each DAG structure 40 is a set in structure (SIS) list 46, and a collection of used before set (UBS) lists 48. The SIS list 46 comprises the traversal state attributes, e.g. 49k, that are set in the DAG structure 40. The collection of UBS lists 48 comprises a UBS list, e.g. 47i, for each structure-invoking element, e.g. 44i, of the DAG structure 40. Each UBS list, e.g. 47i, comprises the traversal state attributes that are used by structure elements subsequent to the structure-invoking element, e.g. 44i, before the traversal state attributes are set.

In one group of embodiments, the SIS list 46 as well as the collection of UBS lists, 48, are established at the time the DAG structure 40 is edited. In an alternate group of embodiments, the SIS list 46 as well as the collection of UBS lists, 48, are established during traversal preparation. For either group, the SIS list 46 and the collection of UBS lists 48 for some embodiments are implemented using bit masks, with each traversal state attribute assigned one bit. For the SIS bit mask, a bit value of "1" indicates that the corresponding traversal state attribute is set in the structure, and a bit value of "0" indicates the opposite. Similarly, for the UBS bit masks, a bit value of "1" indicates that the corresponding traversal state attribute is used before set when returning from the invoked structure after the particular invocation, and a bit values of "0" indicates the contrary. Additionally, under the presently preferred embodiment, it is pessimistically assumed that each executed structure network uses all traversal state attributes. It will be appreciated that by making the pessimistic assumption, the UBS list saved with each structure-invoking element is independent of the contents of the invoked structure.

Figure 5:
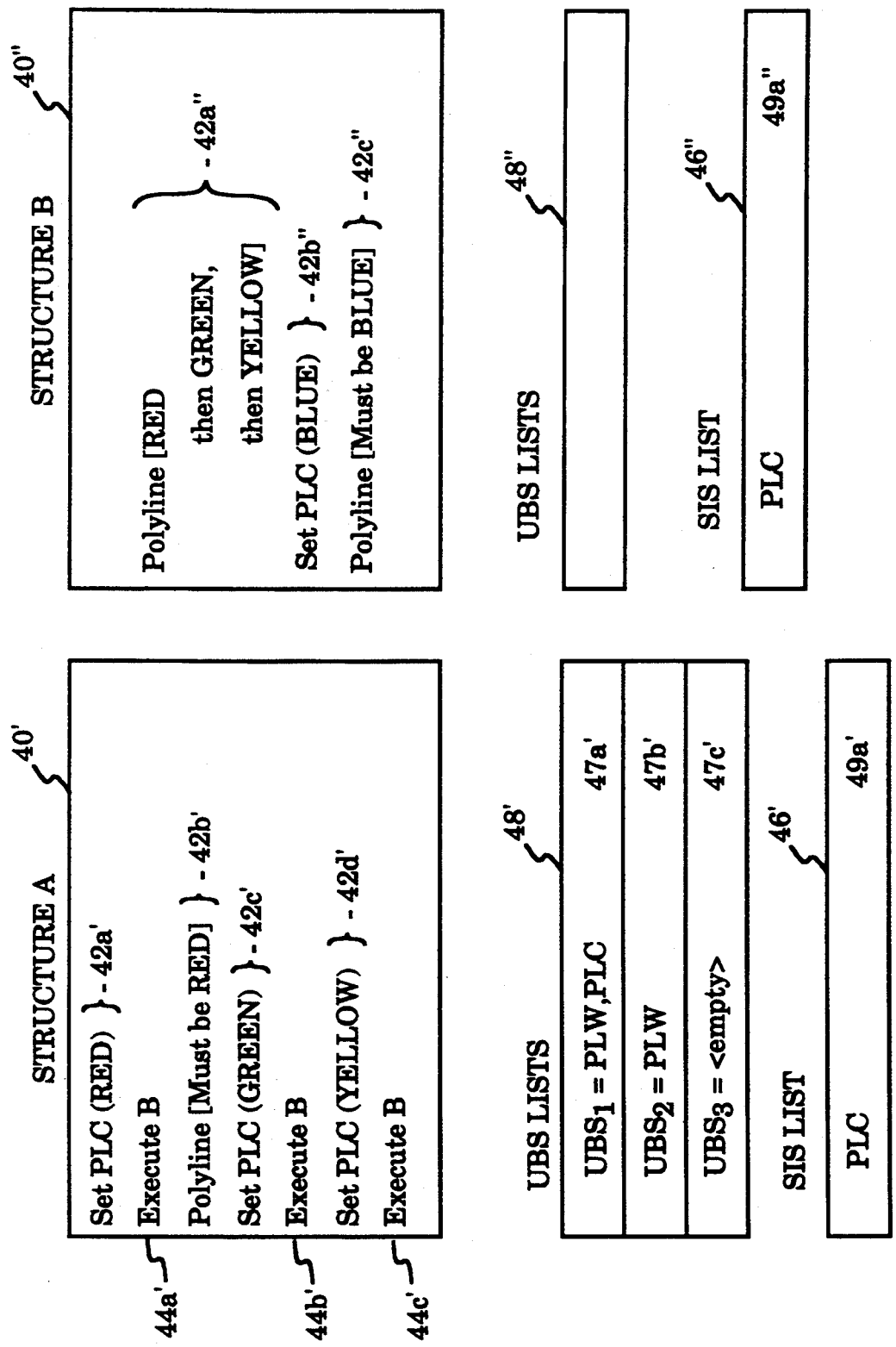
FIG. 5 shows two exemplary PHIGS structures and their corresponding UBS and SIS lists.

Referring now to FIG. 5, a block diagram illustrating two exemplary PHIGS structures in an enhanced PHIGS incorporated with the teachings of the present invention is shown. Shown is an exemplary PHIGS structure B 40", comprising three non-structure-invoking elements 42a"–42c", and zero structure-invoking elements. The exemplary traversal state attribute "PLC" is set in one of the non-structure-invoking elements 42b". Thus, the SIS list 46" comprises the exemplary traversal state attribute "PLC" 49a", and the collection of UBS list 48" is empty.

Also shown is an exemplary PHIGS structure A 40', comprising four non-structure-invoking elements 42a'–42d', and three structure-invoking elements 44a'–44c'. The exemplary traversal state attribute "PLC" is set in three of the non-structure-invoking elements, 42a', 42c' and 42d', and the exemplary structure B 40" is invoked in three of the structure-invoking elements, 44a', 44b', and 44c'. Thus, the SIS list 46' comprises the exemplary traversal state attribute "PLC" 49a', and the collection of UBS list 48' comprises three UBS lists, 47a'–47c'. Assume further that the exemplary traversal state attribute universe for these two structures 40' and 40" comprises only two exemplary traversal state attributes "PLW" and "PLC". Since the second non-structure-invoking element "polyline" 42b' preceded both subsequent "set" non-structure-invoking elements, 42c' and 42d', thus the first UBS list 47a' corresponding to the first structure-invoking element 44a' comprises both exemplary traversal state attributes "PLW" and "PLC". Since the third "set" non-structure-invoking element 42d', which sets the exemplary traversal state attribute "PLC", preceded the next structure-invoking element 44c', thus the second UBS list 47b' corresponding to the second structure-invoking element 44b' comprises only the exemplary traversal state attribute "PLW". Lastly, since no attribute-using element follows the third structure-invoking element 44c', thus its corresponding UBS list 47c' comprises no traversal state attribute.

Figure 6:
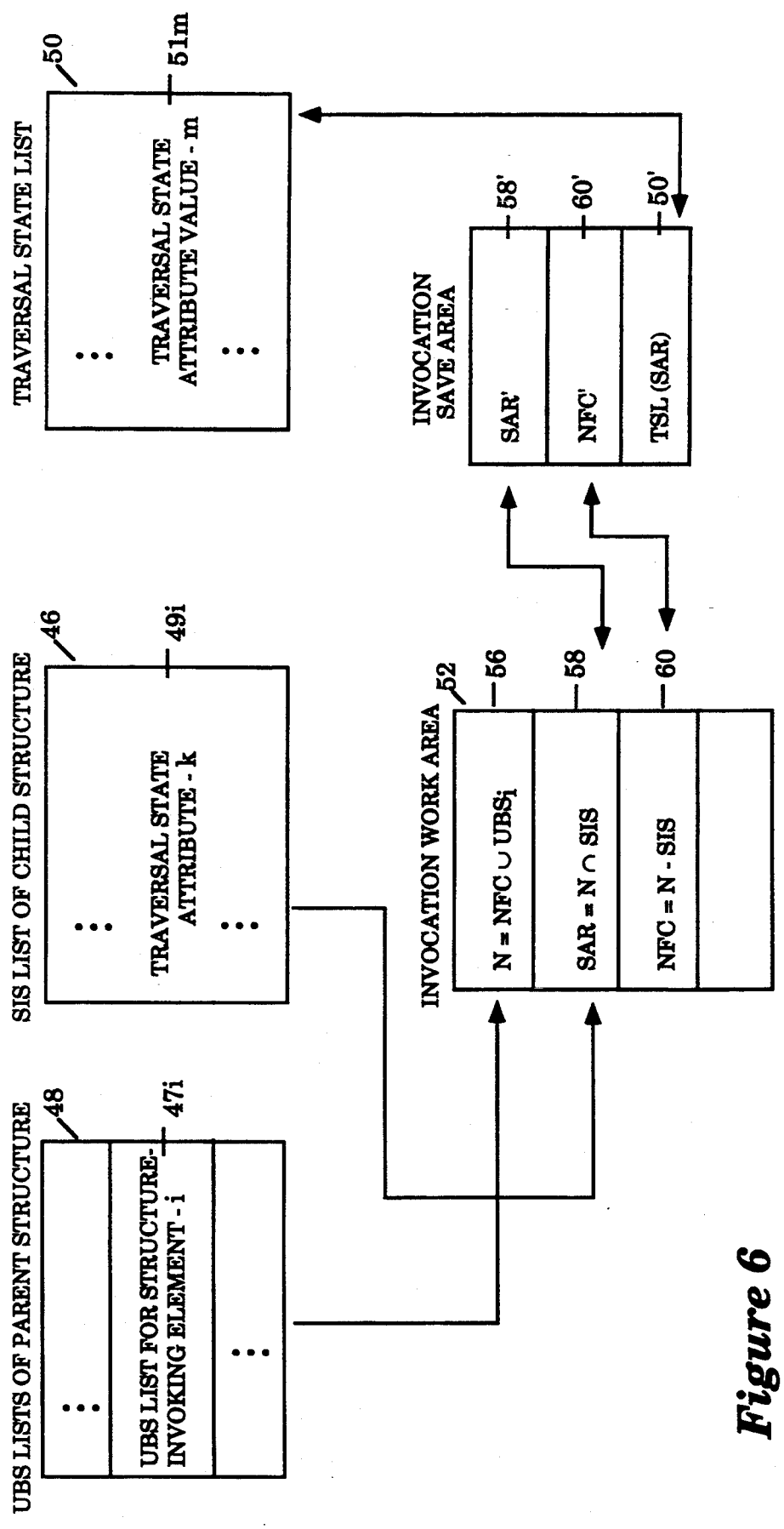
FIG. 6 illustrates the invocation work area and the invocation save area of the present invention.
Figure 7:
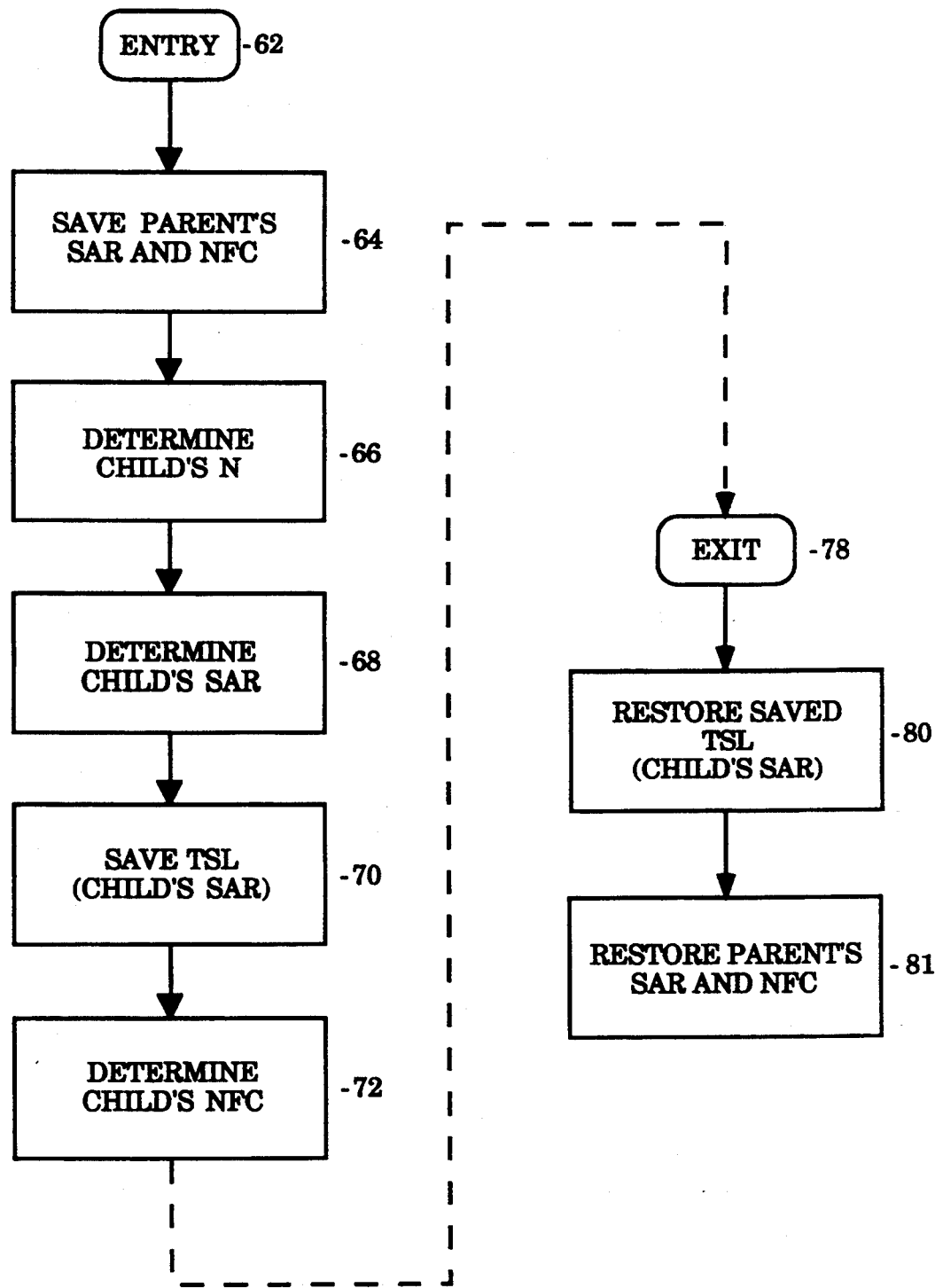
FIG. 7 illustrates the method of the present invention for saving and restoring traversal state attributes when a parent structure invokes a child structure for traversal.

Referring now to FIGS. 6–7, two block diagrams illustrating the invocation work area and invocation save area of the present invention, and the method of the present invention for saving and restoring traversal state attributes of a DAG structure network for a parent structure when it invokes a child structure for traversal are shown. Shown in FIG. 6 is an invocation work area 52 comprising an area for storing a needed (N) list 56, an area for storing a saved and restored (SAR) list 58, and an area for storing a need from child (NFC) list 60. The invocation work area 52 is shared among the DAG structures of a DAG structure network for parent-child invocations. The N list 56 is a determined list comprising traversal state attributes that are needed by a parent structure. The SAR list 58 is a determined list comprising traversal state attributes that need to be saved and restored for a parent structure. The NFC list 60 is a determined list comprising traversal state attributes a parent structure needs from its child structure.

The N list 56 is determined based on the union of a parent's NFC and UBS lists, 60 and 47$i'$. If a child structure is the top-most structure of a structure network being traversed, the invocation of the child structure is treated as if the child structure is invoked by a pseudo parent structure with an arbitrary NFC list 60 and a UBS list 47$i$ comprising the universe of all traversal state attributes. The SAR list 58 is determined based on the intersection of a child's N and SIS lists, 56 and 46. Lastly, the NFC list 60 is determined based on the traversal state attributes that are members of a parent's N list 56, but not members of the child's SIS list 46.

Also shown in FIG. 6 is an invocation save area 54 comprising an area for saving a SAR list (SAR') 58', an area for saving a NFC list (NFC') 60', and an area for saving a subset of TSL attributes 50'. An invocation save area 54 is established for each parent-child invocation. The SAR' list 58' comprises a parent structure's save and restore traversal state attributes for the grandparent structure, i.e. the parent's parent. The NFC' list 60' comprises traversal state attributes a parent structure needs from its child structure. The set of saved TSL attributes 50' comprises the TSL attributes saved for a parent structure in accordance to its child's determined SAR list 58. Only those traversal state list attributes present in the SAR list 58 are saved, as they are the only traversal state list attributed that need to be saved.

The SAR' and NFC' lists, 58' and 60', are copied from the SAR and NFC lists, 58 and 60, stored in the invocation work area 52. On restoration, the saved SAR' and NFC' lists, 58' and 60', are copied back, replacing the SAR and NFC lists, 58 and 60, in the invocation work area 52. The TSL(SAR) list 50' is extracted from the traversal state list 50 in accordance to the SAR list 60 stored in the invocation work area 52. Similarly, on restoration, the saved TSL(SAR)list 50' is copied back, refreshing the traversal state list 50. Since the TSL(SAR) list 50' comprises only those traversal state attributes that need to be saved, saving and restoring of other attributes in the universe of traversal state is avoided, without affecting the binding of attributes to any primitives.

FIG. 7 illustrates the timings when the various lists are determined and stored under the method of the present invention for saving and restoring traversal state attribute values when a parent structure invokes a child structure for traversal. As illustrated, a parent structure's SAR and NFC lists are copied from the invocation work area and saved into an invocation save area upon entry into the child structure, when the child structure is invoked by the parent structure, block 64. As will be obvious from the descriptions to follow, the parent's SAR and NFC lists were determined at the time when the parent was entered. Then, the child structure's N and SAR lists are determined as described earlier, and stored in the invocation work area, blocks 66 and 68. Upon determining the child structure's SAR list, a subset of TSL attribute values is saved into invocation save area according to the determined SAR list, block 70. Additionally, the child's NFC list is determined, block 70, in the event that the child structure in turn invokes a grandchild structure.

Eventually, upon exiting from the child structure, block 78, the saved subset of TSL attribute values based on the child's SAR list is restored in the TSL, block 80. Then the parent structure's SAR and NFC lists saved in the invocation save area are restored in the invocation work area, block 81. As a result, saving and restoring of other attributes in the universe of traversal state is avoided, without affecting the binding of attributes to any primitives.

Referring now to FIG. 8, a block diagram illustrating the savings and restoring of traversal state attributes for the exemplary structures of FIG. 5 under the present invention is shown. As illustrated, when structure A is entered after it has been posted for display, UBS of the invoking structure element of structure A's parent structure equals "ALL"; both SAR and NFC of structure A's parent structure equals "ANYTHING" 82. After saving structure A's parent's SAR and NFC, structure A's N list is determined to be "ALL" 84, it's SAR list is determined to be "PLC" 86, and its NFC list is additionally determined to be "PLW" 88. As a result, the value of attribute "PLC" in TSL is saved for structure A's parent 90. Upon exit from structure A, the saved value of attribute "PLC" for structure A's parent is restored in TSL 92. For simplicity, structure A's parent's saved SAR (SAR'="ANYTHING") and saved NFC (NFC'="ANYTHING") may also be restored. Saving and restoring of attribute "PLW" has been avoided.

When structure B is entered for the first time, $UBS_1$ equals "ALL", SAR ="PLC", and NFC equals "PLW" 94. After saving structure A's SAR and NFC, structure B's N list is determined to be "ALL" 96, its SAR list is determined to be "PLC" 98, and its NFC list is additionally determined to be "PLW" 100. As a result, the value of attribute "PLC" in TSL is saved for structure A 102. Upon exit from structure B, the saved value of attribute "PLC" is restored in TSL for structure A 104. Structure A's saved SAR (SAR'="PLC") and saved NFC (NFC'="PLW") are also restored. Again, saving and restoring of attribute "PLW" has been avoided.

When structure B is entered for the second time, $UBS_2$ equals "PLW", SAR equals "PLC", and NFC equals "PLW" 94. Again, after saving structure A's SAR and NFC, structure B's N list is determined to be "PLW" 96, its SAR is determined to be empty 98, and its NFC is additionally determined to be "PLW" 100. As a result, no traversal state attribute value in TSL is saved for structure A 102. Upon exit from structure B, no traversal state attribute value is restored in TSL for structure A 104. Structure A's saved SAR (SAR'="PLC") and saved NFC (NFC'="PLW") are restored. This time, saving and restoring of both attributes "PLC" and "PLW" have been avoided.

When structure B is entered for the third time, $UBS_3$ equals empty, SAR equals "PLC", and NFC equals "PLW" 94. Again, after saving structure A's SAR and NFC, structure B's N is determined to be "PLW" 96, its SAR is determined to be empty 98, and its NFC is additionally determined to be "PLW" 100. As a result, no traversal state attribute value in TSL is saved for structure A 102. Upon exit from structure B, no traversal state attribute value is restored in TSL for structure A 104. Structure A's saved SAR (SAR'="PLC") and saved NFC (NFC'="PLW") are restored. Again, saving and restoring of both attributes "PLC" and "PLW" have been avoided.

Figure 9:
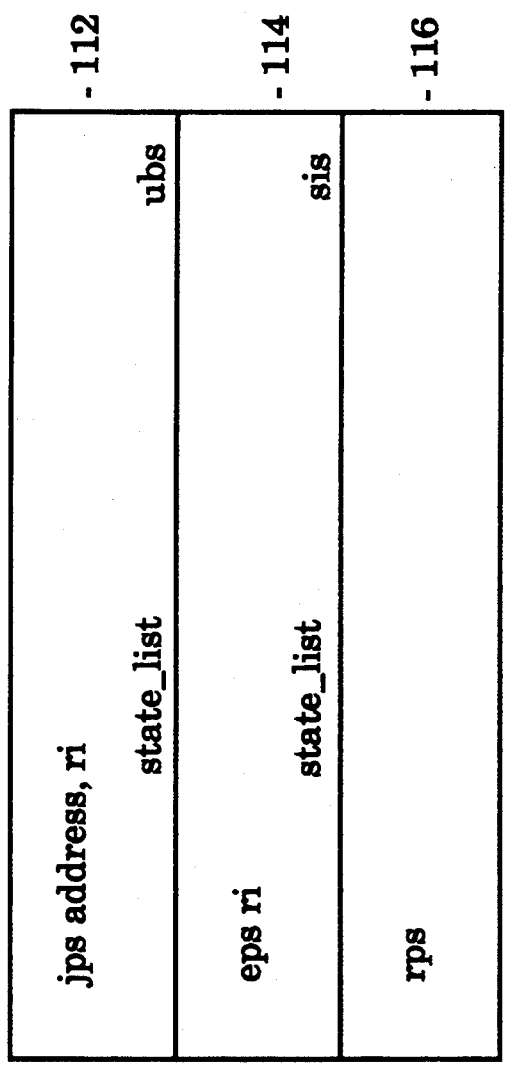
FIG. 9 illustrates one embodiment of the present invention.

Referring now to FIGS. 9, 10, 11a–11d, 12a–12c, nine block diagrams illustrating one embodiment of the method of the present invention are shown. Shown in FIG. 9 are three instructions for invoking PHIGS structures supported by the display processor (reference 14 of FIG. 1), jump to a PHIGS structure (jps) 112, enter a PHIGS structure (eps) 114, and exiting from a PHIGS structure (rps) 116. Jumping to a PHIGS structure is accomplished by storing the return address into a register and transferring control to the child structure using the jps instruction 112. Entering of the structure is accomplished by referencing the register with the stored PHIGS address using the eps instruction 114. Exiting from the entered PHIGS structure is accomplished by executing the rps instruction 116. Both the jps and eps instructions are followed immediately by an attribute bit mask: the jps instruction is followed by the UBS bit mask 112, and the eps instruction is followed by the SIS bit mask 114.

Figure 10:
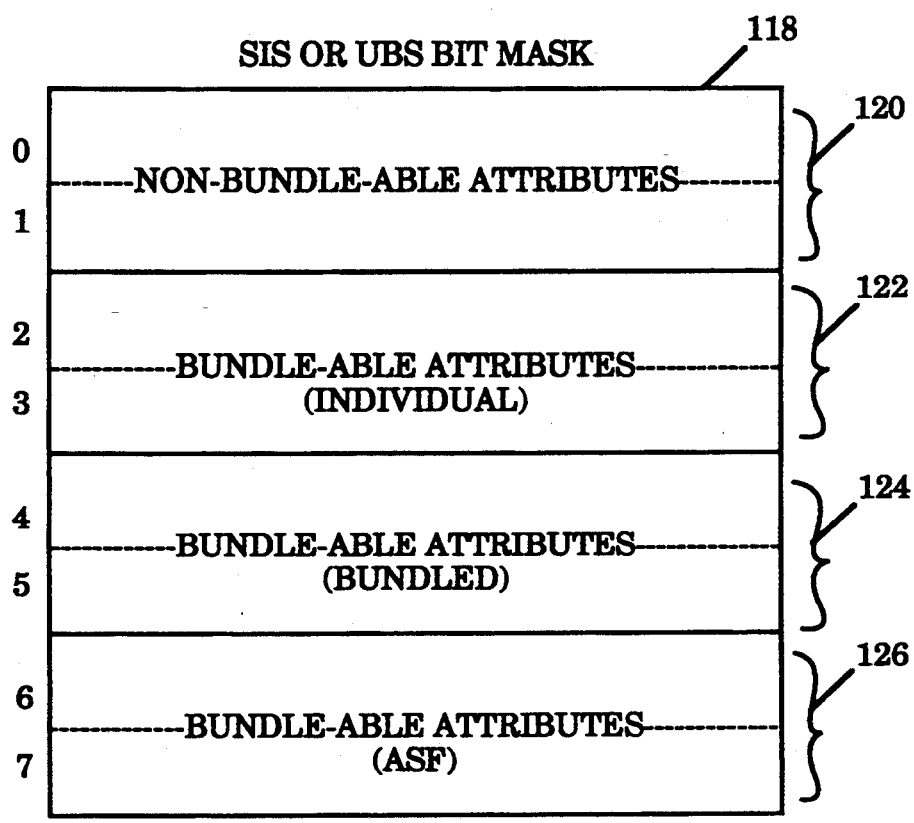
FIG. 10 illustrates the organization of the SIS and UBS masks for the embodiment of FIG. 9.

FIG. 10 illustrates the organization of the SIS and UBS bit masks, which are the same. In both masks, words 0 and 1 comprise the non-bundle-able attributes 120; words 2 and 3 comprises the individual bundle-able attributes 122; words 4 and 5 comprises the bundled bundle-able attributes 124; and words 6 and 7 comprises the aspect source flag (ASF) corresponding to the bundle-able attributes 126. ASF is a flag under PHIGS which indicates whether a particular workstation dependent aspect of an output primitive is to be selected from an attribute bundle, or as an individual attribute selection. FIGS. 11a–11b illustrates exemplary non-bundleable attributes in words 0 and 1 respectively. FIG. 11c illustrates exemplary bundle-able attributes in words 2, 4, and 6. FIG. 11d illustrates exemplary bundle-able attributes in words 3, 5, and 7.

Figures 12A, 12C:
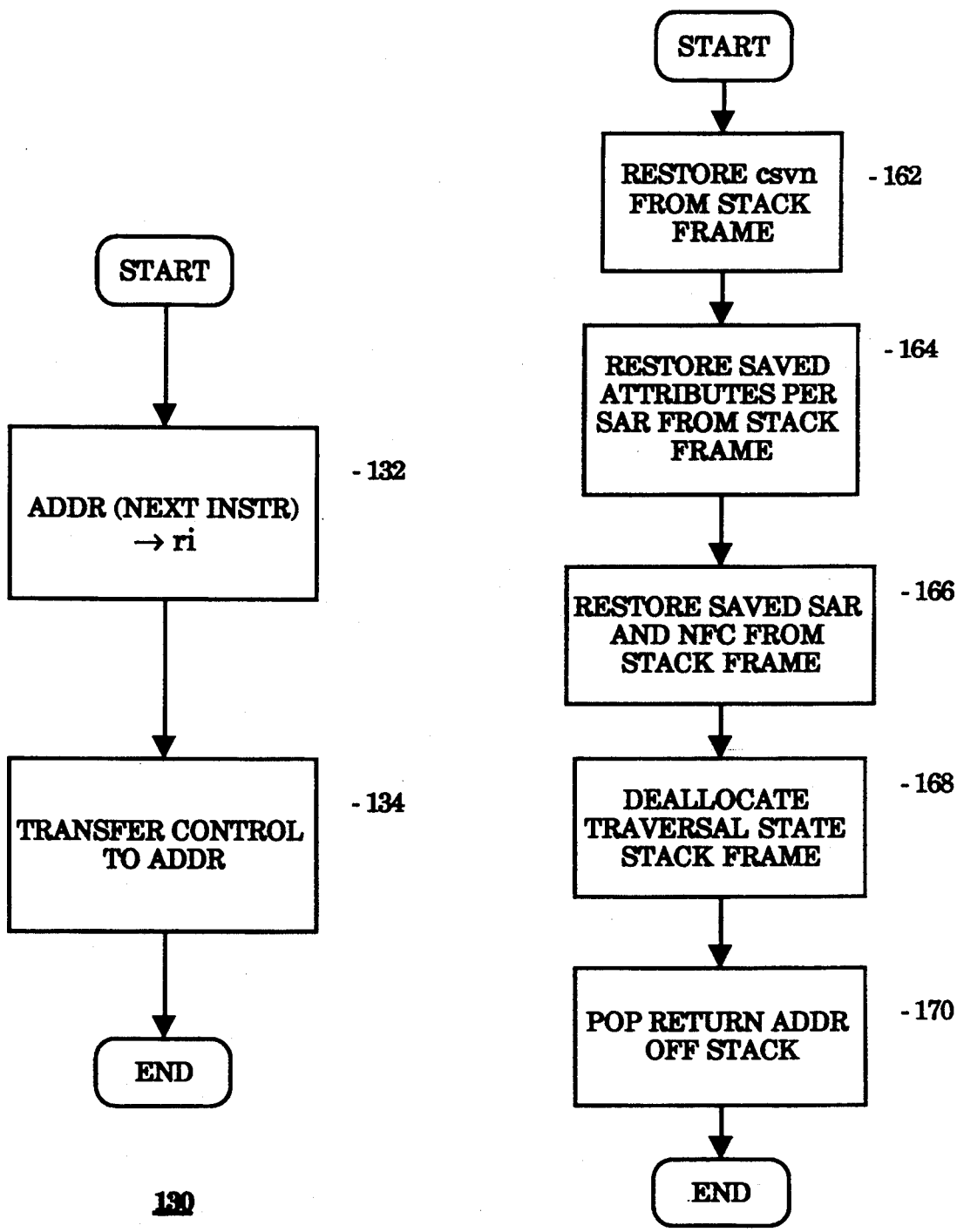
FIG. 12a–12c illustrate the operation flow of the instructions of the embodiment of FIG. 9.

FIG. 12a illustrates the operation flow of the jps instruction. Upon executing the jps instruction, the address of the next instruction is stored into the specified register 132. Then control is transferred to the specified address 134.

Figure 12B:
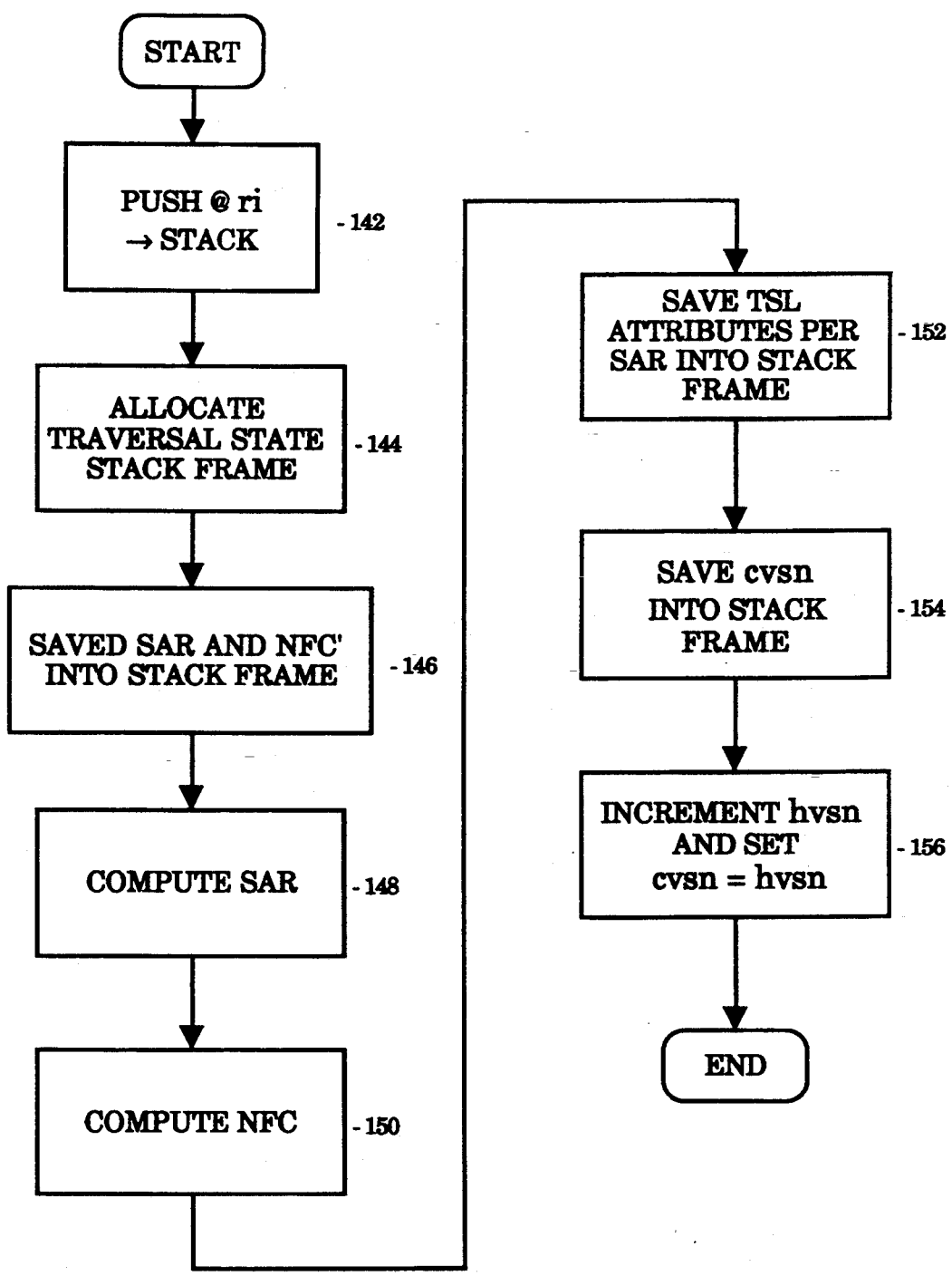

FIG. 12b illustrates the operation flow of the eps instruction. Upon executing the eps instruction, the content of the specified register, i.e. the return address, is pushed into a stack 142, and the traversal state stack frame is allocated 144. Then, the SAR and NFC of the invoking structure are saved in the stack frame, block 146. Upon saving the two lists of the invoking structure, the SAR and NFC of the invoked structure are computed, 148 and 150. After computing the new SAR, TSL attribute values are saved into the stack frame for the invoking structure based on the newly determined SAR, block 152. Lastly, the current structure visit number (csvn) is also saved into the stack frame, the highest structure visit number (hsvn) is incremented, and csvn is set to hsvn, blocks 154 and 156. The csvn and hsvn are features of this embodiment included here for illustrative only; the present invention may be practiced without them.

FIG. 12c illustrates the operation flow of the rps instruction. Upon executing the rps instruction, csvn is restored from the stack frame. Then, the saved TSL attribute values for the invoking structure, per the invoked structure's SAR, are restored from the stack frame, block 164. Similarly, the saved SAR and NFC of the invoking structure are also restored from the stack frame, block 166. After restoration, the traversal state stack frame is deallocated, block 168, and the return address is popped off the stack, block 170, and control is transferred to the return address popped off the stack.

While the present invention has been described in terms of presently preferred and alternate embodiments, those skilled in the art will recognize that the invention is not limited to the embodiments described. The method and apparatus of the present invention can be practiced with modification and alteration within the spirit and scope of the appended claims. The description is thus to be regarded as illustrative instead of limiting on the present invention.

What is claimed is

1. In a computer system comprising structures organized as a directed acyclic graph (DAG) structure network by the order the structures invoke each other, including a parent and a child structure, a method for saving and restoring traversal state attribute values of said DAG structure network for said parent structure when it invokes said child structure for traversal, said method comprising the steps of:

a) establishing a used before set (UBS) list of traversal state attributes for a structure-invoking element of said parent structure, said UBS list identifying traversal state attributes that are subsequently used after said structure-invoking element but before their values are set by attribute setting elements of said parent structure, said structure-invoking element invoking said child structure for traversal when interpreted;

b) establishing a set in structure (SIS) list of traversal state attributes for said child structure, said SIS list identifying traversal state attributes whose values are set in said child structure;

c) establishing a need from child (NFC) list of traversal state attributes for said parent structure invocation of said child structure, said NFC list identifying traversal state attributes that are needed from said child structure by said parent structure upon returning from said invocation of said child structure;

d) establishing a save and restore (SAR) list of traversal state attributes for said parent structure invocation of said child structure using said UBS, SIS and NFC lists of traversal state attributes, said SAR list identifying traversal state attributes that are to be saved for said parent structure before traversing said child structure and restored after traversing said child structure;

e) saving traversal state attribute values for said parent structure invocation of said child structure in accordance to said determined SAR list of traversal state attributes before traversing said child structure; and f) restoring said saved traversal state attribute values for said parent structure invocation of said child structure upon exiting said child structure after said child structure has been traversed.

2. The method as set forth in claim 1, wherein, said UBS and SIS lists are established as an integral part of editing said parent and child structures.

3. The method as set forth in claim 1, wherein, said UBS and SIS lists are established as an integral part of traversal preparation.

4. The method as set forth in claim 1, wherein, said NFC list is established at the time when said parent structure is entered, and before said parent structure is traversed.

5. The method as set forth in claim 1, wherein, said step d) comprises the steps of:
   d.1) determining a needed (N) list of traversal state attributes for said parent structure invocation of said child structure, said N list identifying traversal state attributes that are nominally needed to be saved for said parent structure before traversing said child structure, said N list being equal to the union of said UBS and NFC lists; and
   d.2) determining said SAR list using said N list and said SIS list, said SAR list being equal to the intersection of said N and SIS lists;
   said steps d.1) and d.2) being performed upon entering said child structure, and before said child structure is traversed.

6. The method as set forth in claim 1, wherein, if said child structure is the topmost structure of said DAG structure network, said parent structure is a pseudo structure comprising a pseudo structure-invoking element for invoking said child structure, said UBS list of said pseudo structure-invoking element comprising all traversal state attributes of said DAG structure network.

7. The method as set forth in claim 1, wherein,
   said UBS list is made available to said step d) as an integral part of executing a first instruction of said computer system for identifying said child structure for traversal;
   said SIS list is made available to said step d) as an integral part of executing a second instruction of said computer system for entering said child structure for traversal;
   said steps c), d) and e) are performed as an integral part of executing said second instruction; and
   said step f) is performed as an integral part of executing a third instruction for exiting said child structure and returning to said parent structure.

8. The method as set forth in claim 7, wherein, said first, second, and third instruction are display processor instructions of a display processor of said computer system.

9. In a computer system comprising structures organized as a directed acyclic graph (DAG) structure network, including a parent and a child structure, an apparatus for saving and restoring traversal state attribute values of said DAG structure network for said parent structure when said parent structure invokes said child structure for traversal, said apparatus comprising:
   a) first list establishment means for establishing a used before set (UBS) list of traversal state attributes for a structure-invoking element of said parent structure, said UBS list identifying traversal state attributes that are subsequently used after said structure-invoking element but before said traversal state attributes' values are set by attribute-setting elements of either said parent or said child structures, said structure-invoking element invoking said child structure for traversal when interpreted;
   b) second list establishment means for establishing a set in structure (SIS) list of traversal state attributes for said child structure, said SIS list identifying traversal state attributes whose values are set in said child structure;
   c) third list establishment means for establishing a need from child (NFC) list of traversal state attributes for said parent structure invocation of said child structure, said NFC list identifying traversal state attributes that are needed from said child structure by said parent structure upon returning from said child structure;
   d) fourth list establishment means coupled to said first, second, and third list establishment means for establishing a save and restore (SAR) list of traversal state attributes for said parent structure invocation of said child structure using said UBS, SIS and NFC lists of traversal state attributes, said SAR list identifying traversal state attributes that are to be saved for said parent structure before traversing said child structure and restored after traversing said child structure;
   e) saving means coupled to said fourth list establishment means for saving traversal state attribute values for said parent structure invocation of said child structure in accordance to said SAR list of traversal state attributes before traversing said child structure; and
   f) restoration means coupled to said saving means for restoring said saved traversal state attribute values for said parent structure invocation of said child structure upon exiting said child structure after said child structure has been traversed.

10. The apparatus as set forth in claim 9, wherein, said apparatus further comprises editing means for editing said parent and child structures, said first and second list establishment means being part of said editing means, said UBS and SIS lists being established as an integral part of editing said parent and child structures respectively.

11. The apparatus as set forth in claim 9, wherein, said apparatus further comprises invocation means for invoking said child structure for traversal, said first and second list establishment means being part of said invocation means, said UBS and SIS lists being established as an integral part of traversal preparation.

12. The apparatus as set forth in claim 9, wherein, said third list establishment means establishes said NFC list at the time when said parent structure is entered and before said parent structure is traversed.

13. The apparatus as set forth in claim 9, wherein,
   said fourth list establishment means determines a needed (N) list of traversal state attributes for said parent structure invocation of said child structure, said N list identifying traversal state attributes that are nominally needed to be saved for said parent structure before traversing said child structure, said N list being equal to the union of said UBS and NFC; and
   said fourth list establishment means determines said SAR list using said N list and said SIS list, said SAR list being equal to the intersection of said N and SIS lists;

said fourth list establishment means performs said determinations when said child structure is entered and before said child structure is traversed.

14. The apparatus as set forth in claim 9, if said child structure is the top-most structure of said DAG structure network, said parent structure is a pseudo structure comprising a pseudo structure-invoking element for invoking said child structure, said UBS list of said pseudo structure-invoking element comprising all traversal state attributes of said DAG structure network.

15. The apparatus as set forth in claim 9, wherein, said computer system further comprises a first instruction for identifying said parent and child structures for traversal, a second instruction for entering said parent and child structures to traverse said parent and child structures, a third instruction for exiting said parent and child structures after traversing said parent and child structures, and execution means for executing said first, second and third instructions;

said first list establishment means being coupled to said execution means makes available said UBS list to said execution means when said execution means executes said first instruction to identify said child structure for traversal;

said second list establishment means being coupled to said execution means makes available said SIS list to said execution means when said execution means executes said second instruction to enter said child structure to traverse said child structure;

said third list establishment means being an integral part of said execution means establishes said NFC list for said parent structure invocation of said child structure when said execution means executes said second instruction to enter said parent structure to traverse said parent structure;

said fourth list establishment means being an integral part of said execution means establishes said SAR list for said parent structure invocation of said child structure when said execution means executes said second instruction to enter said child structure to traverse said child structure;

said saving means being an integral part of said execution means saves said traversal state attribute values for said parent structure invocation of said child structure in accordance to said SAR list of traversal state attributes when said execution means executes said second instruction to enter said child structure to traverse said child structure; and said restoration means being an integral part of said execution means restores said saved traversal state attribute values for said parent structure invocation of said child structure when said execution means executes said third instruction to exit said child structure.

16. The apparatus as set forth in claim 15, wherein, said execution means comprises a display processor; and said first, second, and third instruction are display processor instructions of said display processor.

* * * * *